(12) United States Patent
Burton et al.

(10) Patent No.: US 10,180,115 B2
(45) Date of Patent: Jan. 15, 2019

(54) PISTON CROWN BOWLS DEFINING COMBUSTION CHAMBER CONSTRUCTIONS IN OPPOSED-PISTON ENGINES

(71) Applicant: Achates Power, Inc., San Diego, CA (US)

(72) Inventors: Tristan M. Burton, San Francisco, CA (US); Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 1640 days.

(21) Appl. No.: 13/843,686

(22) Filed: Mar. 15, 2013

(65) Prior Publication Data

US 2013/0213342 A1 Aug. 22, 2013

Related U.S. Application Data

(63) Continuation-in-part of application No. 13/066,589, filed on Apr. 18, 2011, now Pat. No. 8,800,528, and (Continued)

(51) Int. Cl.
 *F02B 75/16* (2006.01)
 *F02F 3/26* (2006.01)
 (Continued)

(52) U.S. Cl.
 CPC .................. *F02F 3/26* (2013.01); *F01B 7/02* (2013.01); *F02B 23/0621* (2013.01);
 (Continued)

(58) Field of Classification Search
 CPC ........ F02B 75/28; F02B 75/282; F02B 25/08; F02B 25/10; F02B 23/0618;
 (Continued)

(56) References Cited

U.S. PATENT DOCUMENTS 665,475 A 1/1901 Schweitzer
667,298 A 2/1901 Cunningham
(Continued)

FOREIGN PATENT DOCUMENTS

BE 388676 5/1932
DE 4335515 A1 4/1995
(Continued)

OTHER PUBLICATIONS

Office Action in U.S. Appl. No. 13/066,589, dated Sep. 11, 2013.
(Continued)

*Primary Examiner* — John Zaleskas
(74) *Attorney, Agent, or Firm* — Terrance A. Meador; Julie J. Muyco

(57) ABSTRACT

A combustion chamber for an opposed-piston engine is defined between a pair of pistons disposed for opposing reciprocal movement in a cylinder. The combustion chamber is formed between crowns of the pistons and has a radius that decreases from the longitudinal axis of the cylinder. Each crown includes a periphery, a bowl within the periphery defining a concave surface with a first portion curving inwardly toward the interior of the piston and a second portion curving outwardly from the interior, and a convex surface within the periphery curving outwardly and meeting the second portion of the concave surface to form a ridge. Each ridge has a height that decreases with the distance from a longitudinal axis.

6 Claims, 10 Drawing Sheets

Related U.S. Application Data a continuation-in-part of application No. PCT/US2012/038061, filed on May 16, 2012.

(60) Provisional application No. 61/343,308, filed on Apr. 27, 2010, provisional application No. 61/395,845, filed on May 18, 2010, provisional application No. 61/401,598, filed on Aug. 16, 2010, provisional application No. 61/519,194, filed on May 18, 2011.

(51) Int. Cl.
  *F02B 23/06* (2006.01)
  *F01B 7/02* (2006.01)
  *F02B 75/28* (2006.01)

(52) U.S. Cl.
  CPC ...... *F02B 23/0624* (2013.01); *F02B 23/0633* (2013.01); *F02B 23/0651* (2013.01); *F02B 23/0678* (2013.01); *F02B 75/282* (2013.01); *F02B 2275/48* (2013.01); *Y02T 10/125* (2013.01)

(58) Field of Classification Search
  CPC .............. F02B 23/0621; F02B 23/0624; F02B 23/063; F02B 23/0633; F02B 23/0672; F02B 23/0675; F02B 23/0678; F02B 23/0681; F02B 23/0684; F02B 23/0687; F02B 23/069; F02B 23/0693; F02B 23/0696; F02B 2275/40; F02B 2275/48; F01B 7/02; F01B 7/14; F02F 3/26
  USPC ........ 123/51 B, 51 BA, 51 BD, 51 R, 193.6, 123/295, 299, 301
  See application file for complete search history.

(56) References Cited

U.S. PATENT DOCUMENTS

| | | | |
|---|---|---|---|
| 673,160 A | 4/1901 | Diesel | |
| 1,143,408 A | 6/1915 | Kramer | |
| 1,207,799 A * | 12/1916 | Scheller | 123/281 |
| 1,312,604 A | 8/1919 | Wygodsky | |
| 1,423,088 A | 7/1922 | Crossley et al. | |
| 1,464,268 A | 8/1923 | Otto | |
| 1,486,583 A * | 3/1924 | Huskisson | F02B 75/282 |
| | | | 123/41.83 |
| 1,515,391 A * | 11/1924 | Keller | F02B 23/00 |
| | | | 123/276 |
| 1,523,453 A * | 1/1925 | Lane | F02B 23/00 |
| | | | 123/51 B |
| 1,582,792 A | 4/1926 | Schultz | |
| 1,623,704 A * | 4/1927 | Lane | F02B 75/28 |
| | | | 123/51 B |
| 1,644,954 A | 10/1927 | Shearer | |
| 1,662,828 A | 3/1928 | Law | |
| 1,808,664 A * | 6/1931 | Koschka | F02B 75/26 |
| | | | 123/41.35 |
| 1,837,870 A * | 12/1931 | Johnston | F01B 7/14 |
| | | | 123/198 DC |
| 1,853,562 A | 4/1932 | Herr | |
| 1,854,190 A | 4/1932 | Herr | |
| 1,947,573 A | 2/1934 | Scott | |
| 1,967,630 A | 7/1934 | Rusberg | |
| 1,978,194 A | 10/1934 | Gray | |
| 2,014,672 A | 9/1935 | Schmaljohann | |
| 2,110,116 A | 3/1938 | Heraclio | |
| 2,132,083 A * | 10/1938 | Pescara | F02B 71/00 |
| | | | 123/275 |
| 2,173,081 A * | 9/1939 | Barkeij | F02B 9/00 |
| | | | 123/275 |
| 2,196,429 A | 4/1940 | Siciliano | |
| 2,337,245 A | 12/1943 | Jacklin | |
| 2,354,620 A * | 7/1944 | Smith | F02C 5/06 |
| | | | 123/41.79 |
| 2,393,085 A | 1/1946 | Wuehr | |
| 2,396,429 A * | 3/1946 | Krygsman | F02B 45/02 |
| | | | 123/51 B |
| 2,440,310 A | 4/1948 | Thege | |
| 2,463,418 A | 3/1949 | Pescara | |
| 2,530,884 A * | 11/1950 | Laraque | F01B 7/12 |
| | | | 123/197.1 |
| 2,565,368 A * | 8/1951 | Hammick | F01B 7/14 |
| | | | 123/51 BC |
| 2,607,328 A | 8/1952 | Jencick | |
| 2,646,779 A | 7/1953 | Fiser | |
| 2,682,862 A * | 7/1954 | Camner | F02B 3/00 |
| | | | 123/276 |
| 2,699,156 A | 1/1955 | Karrow | |
| 2,731,003 A | 1/1956 | Morris | |
| 2,748,757 A * | 6/1956 | Morris | F02B 25/00 |
| | | | 123/294 |
| 2,767,691 A | 10/1956 | Mengelkamp et al. | |
| 2,805,654 A | 9/1957 | Jacklin | |
| 2,853,983 A | 9/1958 | Sawle | |
| 3,023,743 A * | 3/1962 | Schauer, Jr. | F01B 7/14 |
| | | | 123/294 |
| 3,033,184 A | 5/1962 | Jackson | |
| 3,117,566 A | 1/1964 | Venediger | |
| 3,134,373 A * | 5/1964 | Schauer, Jr. | F01B 7/14 |
| | | | 123/51 BA |
| 3,209,736 A * | 10/1965 | Witzky | F01B 7/12 |
| | | | 123/48 R |
| 3,411,289 A | 11/1968 | Antonsen et al. | 60/13 |
| 4,030,471 A * | 6/1977 | Ginkel | F01B 1/0613 |
| | | | 123/197.1 |
| 4,090,479 A | 5/1978 | Kaye | |
| 4,248,183 A * | 2/1981 | Noguchi | F01B 7/14 |
| | | | 123/51 B |
| 4,257,365 A * | 3/1981 | Noguchi | F02B 25/08 |
| | | | 123/51 B |
| 4,452,221 A | 6/1984 | Keating | |
| 4,491,096 A * | 1/1985 | Noguchi | F01B 1/10 |
| | | | 123/51 B |
| 4,574,754 A * | 3/1986 | Rhoades, Jr. | F02B 17/005 |
| | | | 123/188.11 |
| 4,622,927 A * | 11/1986 | Wenker | F01B 3/02 |
| | | | 123/51 B |
| 4,700,672 A | 10/1987 | Baguena | |
| 4,791,787 A * | 12/1988 | Paul | F02B 77/02 |
| | | | 123/193.2 |
| 4,872,433 A * | 10/1989 | Paul | F02B 23/02 |
| | | | 123/257 |
| 4,905,637 A * | 3/1990 | Ott | F01B 3/0026 |
| | | | 123/196 R |
| 4,938,180 A | 7/1990 | King | |
| 5,042,441 A * | 8/1991 | Paul | F01B 7/14 |
| | | | 123/257 |
| 5,081,963 A * | 1/1992 | Galbraith | F01L 1/34 |
| | | | 123/188.5 |
| 5,083,530 A | 1/1992 | Rassey | 123/51 R |
| 5,261,359 A | 11/1993 | Hall | 123/65 V |
| 5,367,996 A | 11/1994 | Homil | |
| 5,540,193 A | 7/1996 | Achten | |
| 5,711,269 A * | 1/1998 | Oda | F02B 17/005 |
| | | | 123/262 |
| 6,092,496 A | 7/2000 | Bhargava | |
| 6,161,518 A | 12/2000 | Nakakita et al. | 123/298 |
| 6,170,443 B1 * | 1/2001 | Hofbauer | F02B 25/08 |
| | | | 123/51 B |
| 6,182,619 B1 * | 2/2001 | Spitzer | F02B 25/08 |
| | | | 123/51 B |
| 6,345,601 B1 | 2/2002 | Miyajima et al. | 123/305 |
| 6,443,122 B1 | 9/2002 | Denbratt et al. | |
| 6,854,440 B2 | 2/2005 | Cathcart et al. | 123/298 |
| 6,874,489 B2 | 4/2005 | Yonekawa et al. | 123/661 |
| 6,928,997 B2 | 8/2005 | Yu | 123/657 |
| 6,997,158 B1 | 2/2006 | Liu | 123/279 |
| 7,210,448 B2 | 5/2007 | Stanton et al. | 123/298 |
| 7,284,524 B2 | 10/2007 | Matas et al. | |
| 7,395,809 B2 | 7/2008 | Moller | |

(56) References Cited

U.S. PATENT DOCUMENTS

| | | | |
|---|---|---|---|
| 7,428,889 B2* | 9/2008 | Salzgeber | F02F 3/22 123/193.6 |
| 7,438,039 B2 | 10/2008 | Poola et al. | 123/193.6 |
| 7,597,084 B2 | 10/2009 | Vachon et al. | 123/294 |
| 8,050,844 B2 | 11/2011 | Hoard | |
| 8,186,372 B2 | 5/2012 | Horiba et al. | |
| 8,265,856 B2 | 9/2012 | Hoard | |
| 8,308,038 B2 | 11/2012 | Tanaka et al. | |
| 8,549,854 B2 | 10/2013 | Dion et al. | |
| 8,800,528 B2 | 8/2014 | Fuqua et al. | |
| 8,820,294 B2 | 9/2014 | Fuqua et al. | |
| 2005/0066929 A1 | 3/2005 | Liu | 123/193.4 |
| 2005/0150478 A1 | 7/2005 | Nomura | 123/305 |
| 2006/0124084 A1 | 6/2006 | Hofbauer et al. | 123/55.7 |
| 2006/0157003 A1 | 7/2006 | Lemke et al. | 123/41.38 |
| 2007/0272191 A1 | 11/2007 | Tsujimoto et al. | 123/193.5 |
| 2008/0006238 A1 | 1/2008 | Hofbauer et al. | 123/208 |
| 2008/0066724 A1 | 3/2008 | Klingebiel | |
| 2008/0115771 A1 | 5/2008 | Elsbett | 123/51 BA |
| 2008/0127947 A1 | 6/2008 | Hofbauer et al. | 123/51 R |
| 2009/0139476 A1* | 6/2009 | Hofbauer | F02B 1/12 123/55.2 |
| 2009/0139485 A1 | 6/2009 | Pontoppidan | 123/305 |
| 2009/0159022 A1 | 6/2009 | Chu | 123/52.2 |
| 2009/0240419 A1 | 9/2009 | Hoard | |
| 2010/0006061 A1 | 1/2010 | Shibata et al. | 123/307 |
| 2010/0107868 A1 | 5/2010 | Scharp et al. | 92/159 |
| 2010/0108044 A1 | 5/2010 | Liu | 123/664 |
| 2010/0224162 A1 | 9/2010 | Hofbauer | 123/196 R |
| 2010/0282219 A1* | 11/2010 | Alonso | F01B 3/10 123/51 AA |
| 2011/0041684 A1 | 2/2011 | Kortas et al. | 92/255 |
| 2011/0067671 A1* | 3/2011 | Laimboeck | F02B 23/104 123/298 |
| 2011/0114038 A1 | 5/2011 | Lemke | F16J 9/14 123/41.35 |
| 2011/0192143 A1 | 8/2011 | Andersson | |
| 2011/0271932 A1* | 11/2011 | Fuqua | F01B 7/02 123/301 |
| 2011/0289916 A1 | 12/2011 | Dion et al. | |
| 2012/0029791 A1 | 2/2012 | Hoard | |
| 2012/0073526 A1* | 3/2012 | Dion | F01B 7/08 123/41.44 |
| 2012/0073541 A1* | 3/2012 | Fuqua | F01B 7/02 123/301 |
| 2012/0080007 A1* | 4/2012 | Herold | F02B 23/0645 123/299 |
| 2012/0125298 A1 | 5/2012 | Lemke et al. | |
| 2012/0192831 A1* | 8/2012 | Tusinean | F02B 23/0663 123/299 |
| 2012/0234285 A1 | 9/2012 | Venugopal et al. | 123/193.6 |
| 2012/0285418 A1 | 11/2012 | Elsbett et al. | 123/300 |
| 2013/0014718 A1* | 1/2013 | Shen | F02B 23/0675 123/18 A |
| 2013/0025556 A1* | 1/2013 | Hofbauer | F01B 7/08 123/18 R |
| 2013/0036999 A1* | 2/2013 | Levy | F02B 75/282 123/299 |
| 2013/0104848 A1 | 5/2013 | Klyza et al. | |
| 2013/0112175 A1* | 5/2013 | Wahl | F02F 3/16 123/51 R |
| 2013/0146021 A1* | 6/2013 | Hofbauer | F02B 17/005 123/299 |
| 2013/0213342 A1 | 8/2013 | Burton et al. | |
| 2013/0297182 A1 | 11/2013 | Vincenzi et al. | |
| 2014/0014063 A1 | 1/2014 | Redon | |
| 2014/0083396 A1* | 3/2014 | Burton | F01B 7/02 123/51 R |
| 2014/0090625 A1* | 4/2014 | Dion | F02F 3/16 123/51 R |
| 2015/0003336 A1 | 2/2015 | Kalebjian et al. | |

FOREIGN PATENT DOCUMENTS

| | | | |
|---|---|---|---|
| DE | 19651175 A1 | 6/1998 | |
| DE | 10141888 A1 | 4/2003 | |
| DE | 102004010361 A1 | 12/2004 | |
| DE | 102006055251 A1 | 5/2008 | |
| DE | 102008055911 A1 | 5/2010 | |
| EP | 2077382 A1 | 8/2009 | |
| FR | 848994 | 6/1939 | |
| FR | 50349 | 3/1940 | |
| GB | 191409948 | 4/1915 | |
| GB | 320439 A * | 10/1929 | F02B 23/00 |
| GB | 510542 | 8/1939 | |
| GB | 527873 | 10/1940 | |
| GB | 531366 | 1/1941 | |
| GB | 540658 | 10/1941 | |
| GB | 552758 | 4/1943 | |
| GB | 562343 | 6/1944 | |
| GB | 885281 | 12/1961 | |
| GB | 2493260 | 1/2013 | |
| JP | 52004909 A | 1/1977 | |
| JP | 2005-500450 A | 1/2005 | |
| JP | 2009-138718 | 6/2009 | |
| SU | 1216394 A1 | 3/1986 | |
| WO | WO-99/58830 | 11/1999 | |
| WO | 01/25618 A1 | 4/2001 | |
| WO | WO-02/48524 A1 | 6/2002 | |
| WO | WO-2006/105390 A1 | 10/2006 | |
| WO | 2007/006469 A2 | 1/2007 | |
| WO | 2009/061873 A1 | 5/2009 | |
| WO | 2011/061191 A1 | 5/2011 | |
| WO | WO-2011/139332 A1 | 11/2011 | |
| WO | WO-2012/023970 A2 | 2/2012 | |
| WO | WO-2012/023975 A1 | 2/2012 | |
| WO | WO-2012/158756 A1 | 11/2012 | |
| WO | WO-2013/013756 A1 | 1/2013 | |
| WO | WO-2013/062921 A1 | 5/2013 | |
| WO | WO-2013/126347 A1 | 8/2013 | |
| WO | WO-2014/162143 A1 | 10/2014 | |

OTHER PUBLICATIONS

Hofbauer, P., *SAE Publication 2005-01-1548*, "Opposed Piston Opposed Cylinder (opoc) Engine for Military Ground Vehicles," Apr. 2005.

Franke, M., *SAE Publication 2006-01-0277*, "Opposed Piston Opposed Cylinder (opoc) 450 Engine: Performance Development by CAE Simulations and Testing," M. Franke, et al, Apr. 2006.

Hirsch, N.R., et al, *SAE Publication 2006-01-0926*, "Advanced Opposed Piston Two-stroke Diesel Demonstrator," Apr. 2006.

Pirault, J-P., et al, *Opposed Piston Engines: Evolution, Use, and Future Applications*, 2010, pp. 231-245.

International Search Report/Written Opinion for PCT/ US2011/000692, dated Aug. 18, 2011.

International Search Report/Written Opinion for PCT/ US2011/001436, dated Nov. 3, 2011.

International Search Report/Written Opinion for PCT/ US2012/038061, dated May 16, 2012.

International Search Report/Written Opinion for PCT/ US2011/061381, dated Apr. 12, 2013.

International Search Report and Written Opinion for PCT application No. PCT/US2014/054215, dated Feb. 16, 2016.

Office Action dated Oct. 24, 2017, for Japanese patent application No. JP 2016-502208.

Office Action dated Nov. 16, 2017, for Chinese patent application No. 2014800493435.

Office Action dated Apr. 24, 2018, for Japanese patent application No. 2016-542021.

\* cited by examiner

PISTON CROWN BOWLS DEFINING COMBUSTION CHAMBER CONSTRUCTIONS IN OPPOSED-PISTON ENGINES

PRIORITY

This application is a continuation-in-part of U.S. patent application Ser. No. 13/066,589, filed Apr. 18, 2011, which claims priority to: US provisional application 61/343,308, filed Apr. 27, 2010; U.S. provisional application 61/395,845, filed May 18, 2010; and U.S. provisional application 61/401,598, filed Aug. 16, 2010.

This application is a continuation-in-part of PCT application US2012/038061, filed May 16, 2012, which claims priority to: U.S. provisional application 61/519,194, filed May 18, 2011.

RELATED APPLICATIONS

This application contains material related to that of U.S. patent application Ser. No. 13/136,954, filed Aug. 15, 2011 and published as US 2012/0073541 on Mar. 29, 2012 and U.S. patent application Ser. No. 13/136,955, filed Aug. 15, 2011 and published as US 2012/0073526 on Mar. 29, 2012.

BACKGROUND

The field is combustion chambers for internal combustion engines. In particular, the field includes constructions for opposed-piston engines in which a combustion chamber is defined between crown bowls of pistons disposed in opposition in the bore of a ported cylinder.

Per FIG. 1, a prior art opposed-piston engine includes at least one cylinder 10 with a bore 12 and longitudinally-displaced intake and exhaust ports 14 and 16 machined or formed therein. In some aspects the construction of the cylinder 10 includes a cylinder liner (or sleeve) that defines the bore. Fuel injectors 17 are secured in injector ports (ports where injectors are positioned) that open through the side surface of the cylinder. Two pistons 20, 22 with closed end regions ("crowns") 20c, 22c are disposed in the bore with end surfaces 20e, 22e of the crowns facing each other. For convenience, the piston 20 is denominated as the "intake" piston because of its proximity to the intake port 14. Similarly, the piston 22 is denominated as the "exhaust" piston because of its proximity to the exhaust port 16.

Operation of an opposed-piston engine with one or more ported cylinders (cylinders with one or more of intake and exhaust ports formed therein) such as the cylinder 10 is well understood. In this regard, in response to combustion the opposed pistons move away from respective top dead center (TDC) positions where they are at their innermost positions in the cylinder 10. While moving from TDC, the pistons keep their associated ports closed until they approach respective bottom dead center (BDC) positions where they are at their outermost positions in the cylinder. The pistons may move in phase so that the intake and exhaust ports 14, 16 open and close in unison. Alternatively, one piston may lead the other in phase, in which case the intake and exhaust ports have different opening and closing times. In other configurations, timing offsets can be implemented by placing intake and exhaust ports at different distances from the longitudinal center of the cylinder.

In many opposed-piston constructions, a phase offset is introduced into the piston movements. As shown in FIG. 1, for example, the exhaust piston leads the intake piston and the phase offset causes the pistons to move around their BDC positions in a sequence in which the exhaust port 16 opens as the exhaust piston 22 moves through BDC while the intake port 14 is still closed so that combustion gasses start to flow out of the exhaust port 16. As the pistons continue moving away from each other, the intake piston 20 moves through BDC causing the intake port 14 to open while the exhaust port 16 is still open. A charge of pressurized air is forced into the cylinder 10 through the open intake port 14, driving exhaust gasses out of the cylinder through the exhaust port 16. As seen in FIG. 1, after further movement of the pistons, the exhaust port 16 closes before the intake port 14 while the intake piston 20 continues to move away from BDC. Typically, the charge of fresh air is swirled as it passes through ramped openings of the intake port 14. With reference to FIG. 1, the swirling motion (or simply, "swirl") 30 is a generally helical movement of charge air that circulates around the cylinder's longitudinal axis and moves longitudinally through the bore of the cylinder 10. Per FIG. 2, as the pistons 20, 22 continue moving toward TDC, the intake port 14 is closed and the swirling charge air remaining in the cylinder is compressed between the end surfaces 20e, 22e of the crowns 20c and 22c. As the pistons near their respective TDC locations in the cylinder bore, fuel 40 is injected into the compressed charge air, between the end surfaces 20e, 22e of the pistons. In some aspects, the fuel is injected directly through the side of the cylinder, into the bore, via the injectors 17 ("direct side injection"). As injection continues, the swirling mixture of air and fuel is increasingly compressed in a combustion chamber 32 defined between the end surfaces 20e and 22e as the pistons 20 and 22 move through their respective TDC locations. When the mixture reaches an ignition temperature, the fuel ignites in the combustion chamber, driving the pistons apart toward their respective BDC locations.

Turbulence is a desirable feature of charge air motion as fuel injection begins. Turbulence encourages the mixing of charge air with fuel for more complete combustion. The geometries of the intake port openings and the cylinder of an opposed-piston engine provide a very effective platform for generation of an appropriate swirling motion of the charge air that promotes both removal of exhaust gasses (scavenging) and charge air turbulence. However, charge air motion that is dominated by swirl can produce undesirable effects during combustion. For example, during combustion in a cylindrical combustion chamber defined between flat piston end surfaces, swirl pushes the flame toward the cylinder bore, causing heat loss to the (relatively) cooler cylinder wall. The higher velocity vectors of swirl occur near the cylinder wall, which provides the worst scenario for heat losses: high temperature gas with high velocity that transfers heat to the cylinder wall and lowers the thermal efficiency of the engine. Accordingly, in such opposed-piston engines, it is desirable to maintain charge air turbulence as injection starts while mitigating the undesirable effects produced by swirl.

In certain opposed-piston combustion chamber constructions, turbulence is produced by squish flow from the periphery of the combustion chamber in a radial direction of the cylinder toward the cylinder's axis. Squish flow is generated by movement of compressed air from a relatively high-pressure region at the peripheries of the piston end surfaces to a lower-pressure region in a bowl formed in at least one piston end surface. Squish flow promotes charge' air turbulence in the combustion chamber. For example, U.S. Pat. No. 6,170,443 discloses a cylinder with a pair of opposed pistons having complementary end surface constructions. A circular concave depression formed in one end surface is symmetrical with respect to the axis of its piston and rises to a plateau in its center. The periphery of the opposing end surface has a convex shape in the center of which a semi-toroidal (half donut-shaped) trench is formed. As the pistons approach TDC, they define a generally toroidally-shaped combustion chamber centered on the longitudinal axis of the cylinder. The combustion chamber is surrounded by a circumferential squish band defined between the concave and convex surface shapes. As the pistons approach TDC, the squish band generates an inwardly-directed squish flow into the toroidal trench and creates "a swirl of high intensity near top dead center." See the '443 patent at column 19, lines 25-27. Fuel is injected into the toridal combustion chamber in a radial direction of the bore Increasing the turbulence of charge air in the combustion chamber increases the effectiveness of air/fuel mixing. Domination of charge air motion by swirl or squish flow alone does achieve a certain level of turbulence. Nevertheless, it is desirable to create additional elements of charge air motion as injection commences in order to produce even more turbulence of the charge air, which promotes more uniform mixing than can be obtained with swirl and/or squish, and to mitigate the effects of swirl thereby to reduce the carriage of the heat of combustion to the cylinder wall; one such additional component is tumble. In this regard, tumble is a rotating movement of charge air that circulates in a direction that is transverse to the longitudinal axis of the cylinder. Preferably, the tumbling motion is a circulation of charge air that circulates around a diameter of the cylinder bore.

An exemplary combustion chamber construction for an opposed-piston engine that generates a tumbling component of charge air motion is described and illustrated in US 2011/0271932. The engine includes at least one cylinder with longitudinally-separated exhaust and intake ports, and a pair of pistons disposed in opposition for reciprocating in a bore of the cylinder. As the pistons move toward TDC, a combustion chamber having an elongated ellipsoidal shape is formed in the bore, between the end surfaces of the pistons. The shapes of the end surfaces generate squish flows of charge air having complementary directions that are skewed with respect to a major axis of the combustion chamber. Interaction of the end surface shapes with squish and swirl components of the charge air motion causes generation of one or more tumbling motions in the combustion chamber.

Preferably, the end surface structures of the opposed pistons are identical in shape such that each end surface has a circumferential area centered on the longitudinal axis of the piston, and a bowl within the circumferential area that defines a concave surface with a first portion curving inwardly from a plane containing the circumferential contact area toward the interior of the piston and a second portion curving outwardly from the interior of the piston from the plane containing the circumferential contact area. The pistons are rotationally oriented to place complementary curved surfaces of the bowls in opposition in order to maximize the squish surface areas of the squish zone. These features result in a combustion chamber having the general shape of an elongated ellipsoid.

It has become apparent that a combustion chamber construction for an opposed-piston engine which is specified only as having the general shape of an elongated ellipsoid does not take into account features and dimensions of that "general shape" that can be varied individually, or collectively, in order to increase engine design flexibility and enable achievement of specific goals and requirements for opposed-piston engine performance. Accordingly, there is a need in the field of opposed-piston engine configuration for a systematic volumetric model with which to define combustion chamber constructions by characterization of features and dimensional relationships of combustion chamber elements.

SUMMARY

The three-dimensional shape of the combustion chamber formed between the crowns of two opposed pistons whose end surfaces include bowls has previously been described as ellipsoidal or football-shaped. In this specification, the three-dimensional combustion chamber shape is described in terms of a two-dimensional cross-section that includes shape parameters defining a main volume of the combustion chamber. The main volume of the combustion chamber includes a central region that is closest to the axis of the cylinder which contains the pistons; in some aspects, a portion of the central region is substantially spherical. The two-dimensional cross-section defines a three-dimensional combustion chamber shape that allows the production of tumble due to squish flows directed tangentially to the combustion chamber. Other parallel cross-sections have a similar shape with the exception of a near-injector region where a ridge height approaches zero and a timing edge and squish regions merge to form horizontal squish regions. Desirably, a full three-dimensional piston end surface can be constructed by specifying shape and dimensional parameters of the combustion chamber as a function of the distance along a fuel injection axis.

DETAILED DESCRIPTION

Figure 1:
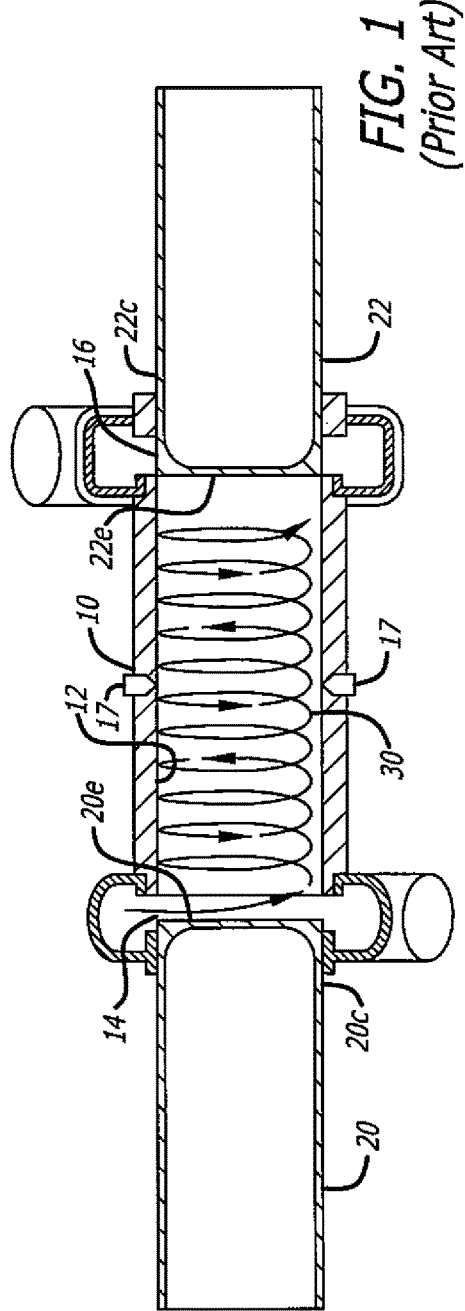
FIG. 1 is a side sectional partially schematic drawing of a cylinder of an opposed-piston engine with prior art opposed pistons near respective bottom dead center locations, and is appropriately labeled "Prior Art".
Figure 2:
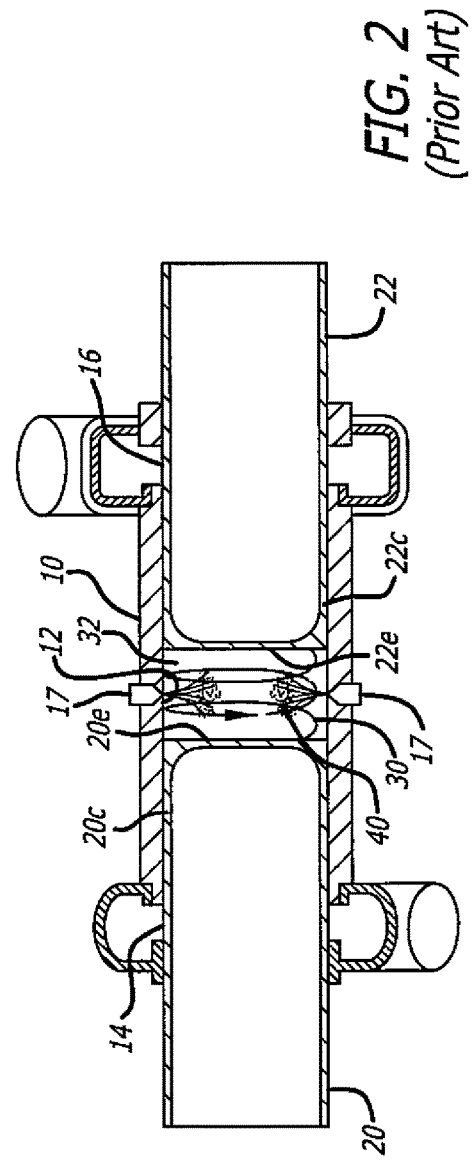
FIG. 2 is a side sectional partially schematic drawing of the cylinder of FIG. 1 with the prior art opposed pistons near respective top dead center locations where flat end surfaces of the pistons define a prior art combustion chamber, and is appropriately labeled "Prior Art".

In the combustion chamber constructions to be described, an internal combustion engine includes at least one cylinder with longitudinally-separated exhaust and intake ports; see, for example, the cylinder 10 illustrated in FIGS. 1 and 2. A pair of pistons is disposed in opposition in a bore of the cylinder and a combustion chamber structure is defined between the opposing end surfaces of the piston crowns as the pistons move toward top dead center positions. A circumferential area on each piston crown defines a periphery on each of the end surfaces. The combustion chamber includes a cavity defined between the end surfaces, and has at least one opening through which fuel is injected (hereinafter an "injection port") that is disposed at least generally in a radial direction of the cylinder and opens into the cavity.

During operation of the internal combustion engine, as the pistons approach TDC, squish zones direct flows of compressed air (called "squish flows") into the combustion chamber in complementary directions that are skewed with respect to a diametrical direction of the bore. This process is referred to as "generating squish". The portions of the end surfaces that generate squish are referred to as squish surfaces, and channels defined between the squish surfaces are referred to as squish channels. Squish flow is deflected or redirected by one or more curved surfaces in a combustion chamber cavity into at least one tumble motion that circulates in the cavity.

In the following descriptions, "fuel" is any fuel that can be used in an opposed-piston engine. The fuel may be a relatively homogeneous composition, or a blend. For example, the fuel may be diesel fuel or any other fuel ignitable by compression ignition. Further, the descriptions contemplate ignition resulting from compression of an air/fuel mixture; however it may be desirable to provide additional mechanisms, such as glow plugs, to assist compression ignition. The descriptions contemplate injection of fuel into a compressed gas in a combustion chamber. The gas is preferably pressurized ambient air; however, it may include other components such as exhaust gases or other diluents. In any such case, the gas is referred to as "charge air."

Figure 3:
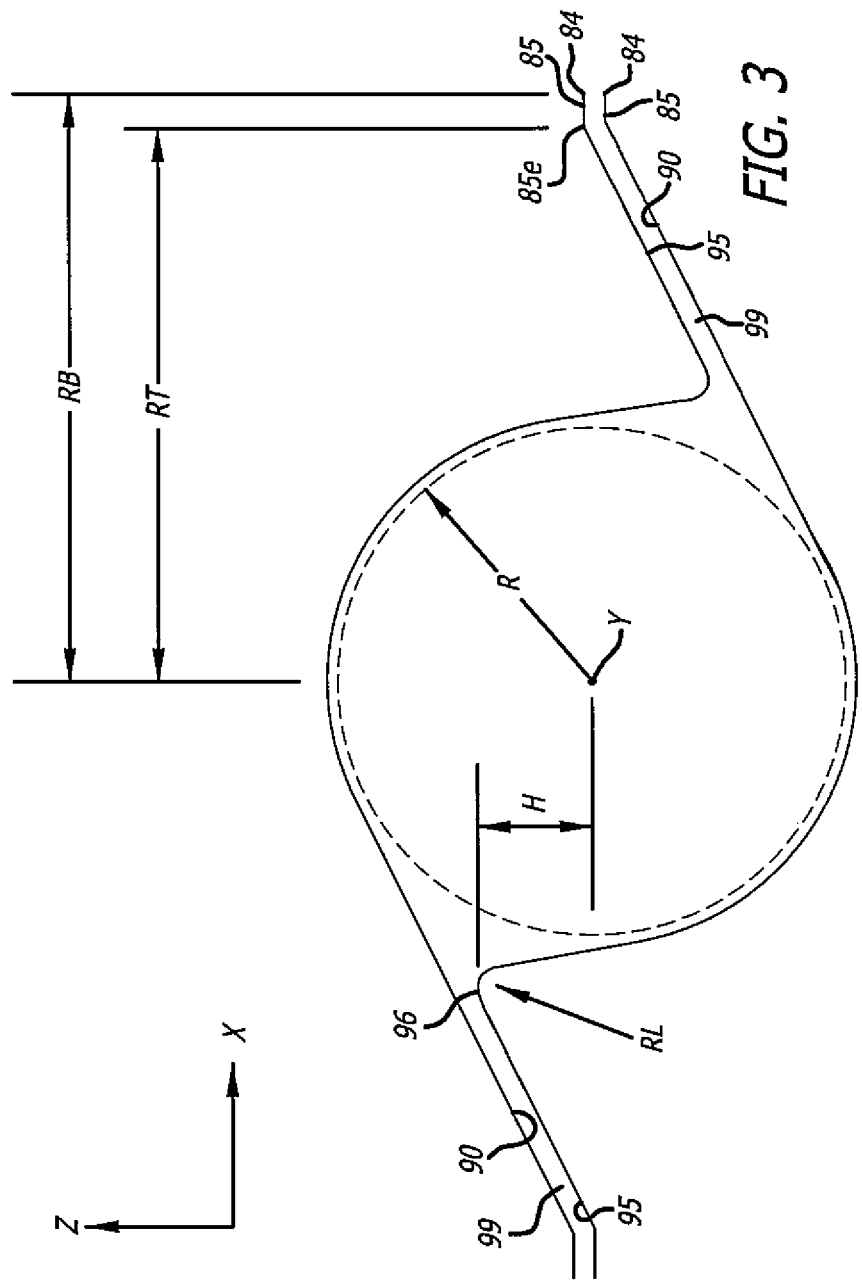
FIG. 3 is a representational schematic drawing showing a cross-section of a combustion chamber defined between the end surfaces of a pair of opposed pistons near their respective TDC locations in a cylinder bore.

FIG. 3 schematically represents a cross-section taken through the longitudinal center of the combustion chamber of an opposed-piston engine in a plane that orthogonally intersects a major axis Y of the combustion chamber; in some aspects, the major axis of the combustion chamber is also the axis of fuel injection into the combustion chamber. In FIG. 3, RB is the bore radius, RT is the timing edge radius, H is the unrounded ridge height, RL is the ridge round radius, and R is the radius of the main volume of the combustion chamber. Specifying each of these combustion chamber parameters as a function of distance along the axis (Y) will describe the three dimensional construction of a bowl formed in the end surface of each of the opposed pistons.

Combustion chamber construction: FIGS. 4A, 4B and 5-7 illustrate a combustion chamber construction that is defined by complementary end surface structures of the crowns of a pair of pistons disposed in a ported cylinder of an opposed-piston engine. The combustion chamber construction includes squish surface areas that provide a squish flow into the combustion chamber. Identical bowls are formed in the end surfaces of the opposed pistons, and the pistons are rotationally oriented to place complementary curved surfaces of the bowls in opposition in order to maximize the squish surface areas of the squish zone. As will be appreciated, the end surface structures are described parametrically by the elements of FIG. 3.

The end surface structure of each piston has a periphery surrounding a bowl defining a concave surface. The concave surface includes a first portion curving away from a plane containing the periphery surface toward the interior of the piston and a second portion curving away from the first portion and protruding outwardly in part from the plane. A convex surface opposite the bowl curves away from the periphery and protrudes outwardly from the plane. The convex surface meets the second portion of the concave surface to form a ridge therewith. The end surface structure is provided on both pistons and the pistons are disposed in the bore of a ported cylinder with their end surfaces oriented to place complementary curved surfaces of the end surface structures in opposition in order to define a combustion chamber. The combustion chamber space defined between these two end surfaces has a generally symmetrical geometry to reinforce and sustain tumble motion.

Figure 4A:
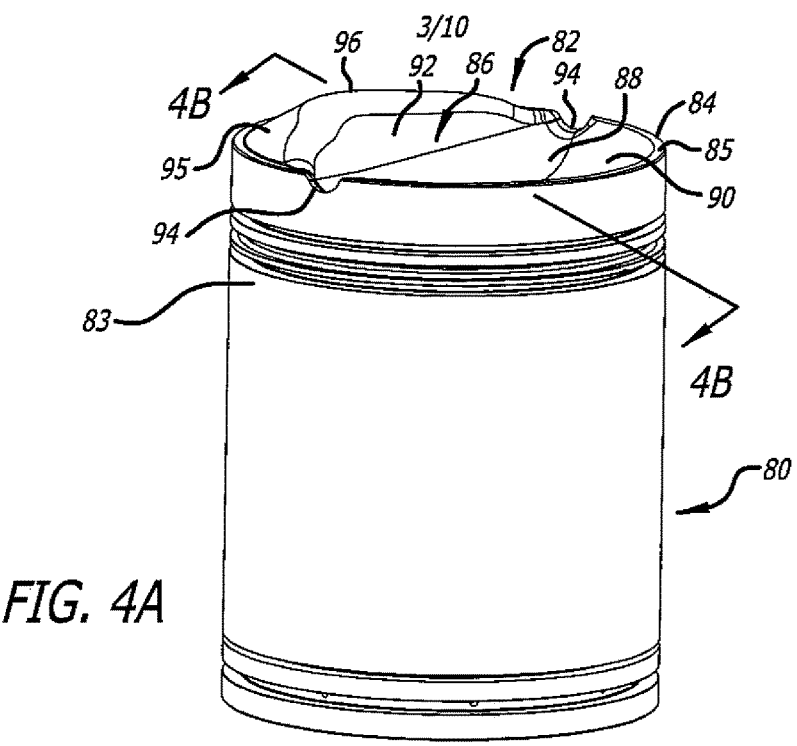
FIG. 4A is an perspective elevation view of one piston of a pair of pistons in which identical end surfaces of the pair of pistons are formed to define a combustion chamber construction in an opposed-piston engine.
Figure 4B:
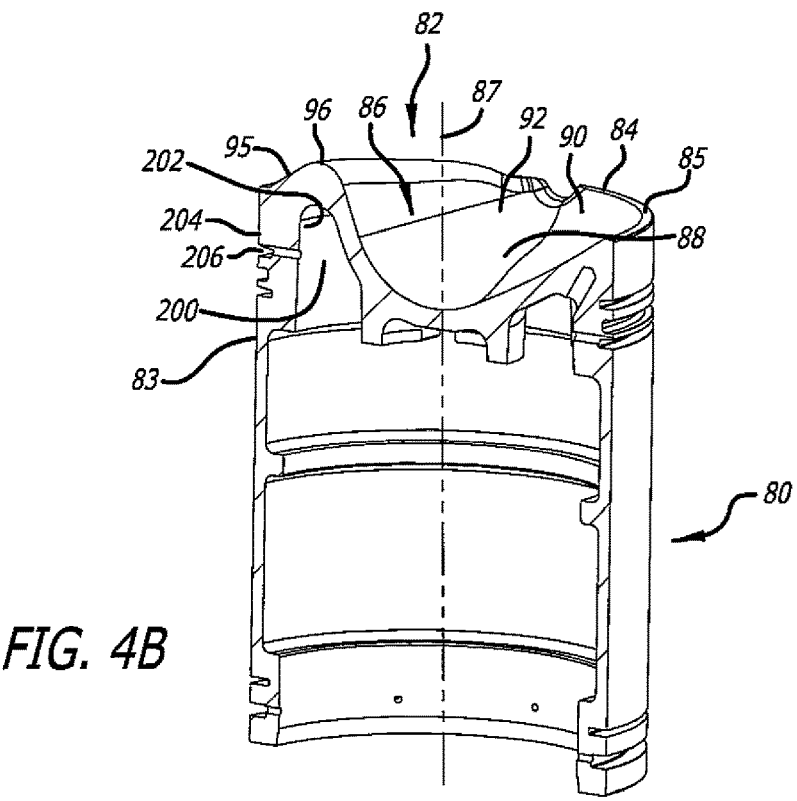
FIG. 4B is a side sectional view of the piston of FIG. 4A, taken along 4B-4B.
Figure 5:
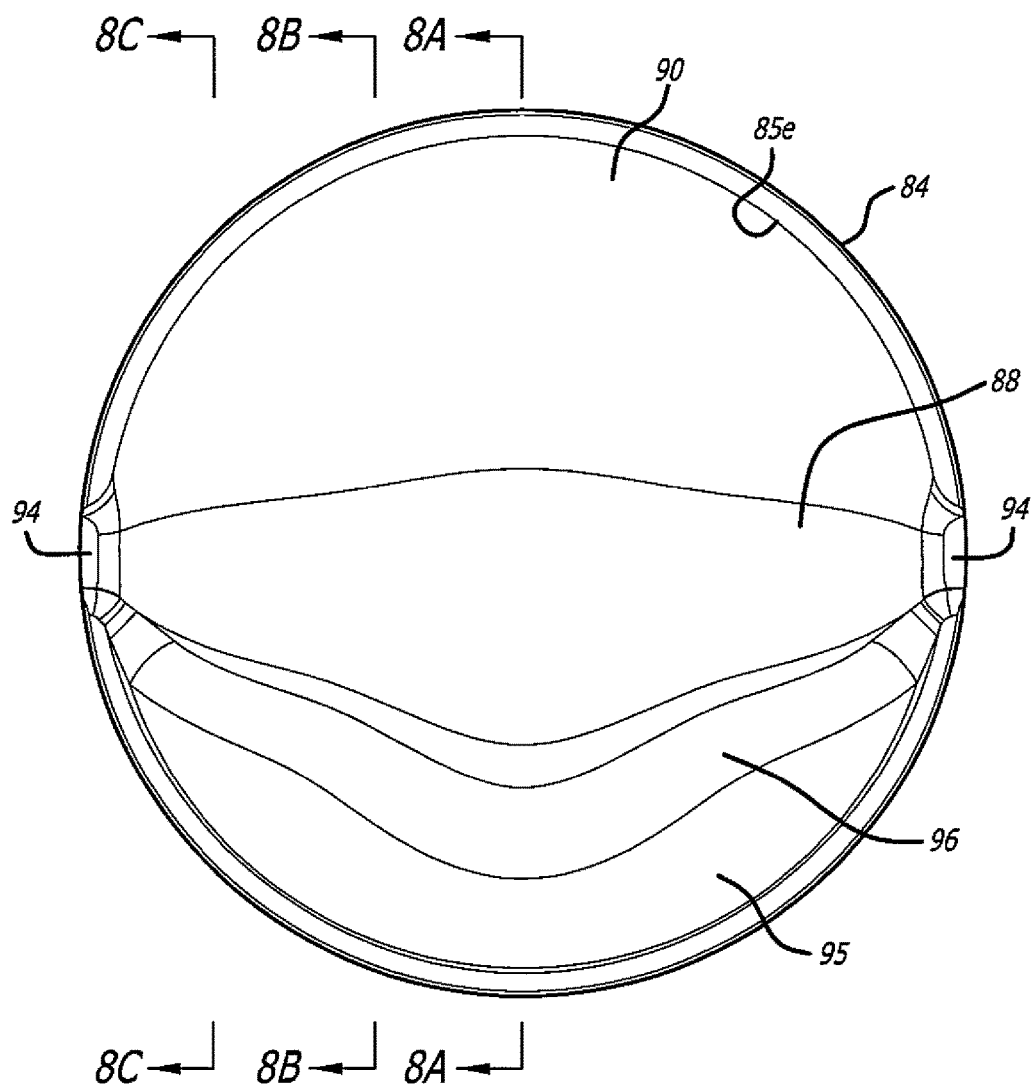
FIG. 5 is a view of the end surface of the piston of FIG. 4A.

The structures of the piston end surfaces that define the combustion chamber construction are essentially identical to each other; accordingly, the piston 80 shown in FIGS. 4A, 4B and 5 represents both the intake piston and exhaust piston. The crown of the piston 80 has end and side surfaces 82 and 83. The end and side surfaces 82 and 83 meet at a periphery 84 centered on the longitudinal axis 87 of the piston 80. Typically, although not necessarily, the periphery 84 is bordered by a circumferential area 85. In some aspects, the circumferential area has a generally annular shape except where notches 94 are formed. A bowl 86 is formed within the periphery. With reference to a plane that is orthogonal to the longitudinal axis 87 of the piston and that contacts the periphery 84, the bowl 86 has a concave surface 88 with a first portion 90 curving inwardly from the plane, toward the interior of the piston 80, and a second portion 92 curving outwardly from the interior of the piston through the plane. The end surface 82 further includes a convex surface 95 within the periphery that curves outwardly from the plane. The convex surface 95 meets the second portion 92 of the concave surface 88 to form a ridge 96 that protrudes outwardly from the end surface 82. At least one notch 94 extends through the periphery into the bowl 86; preferably two aligned notches 94 are provided.

Figure 6:
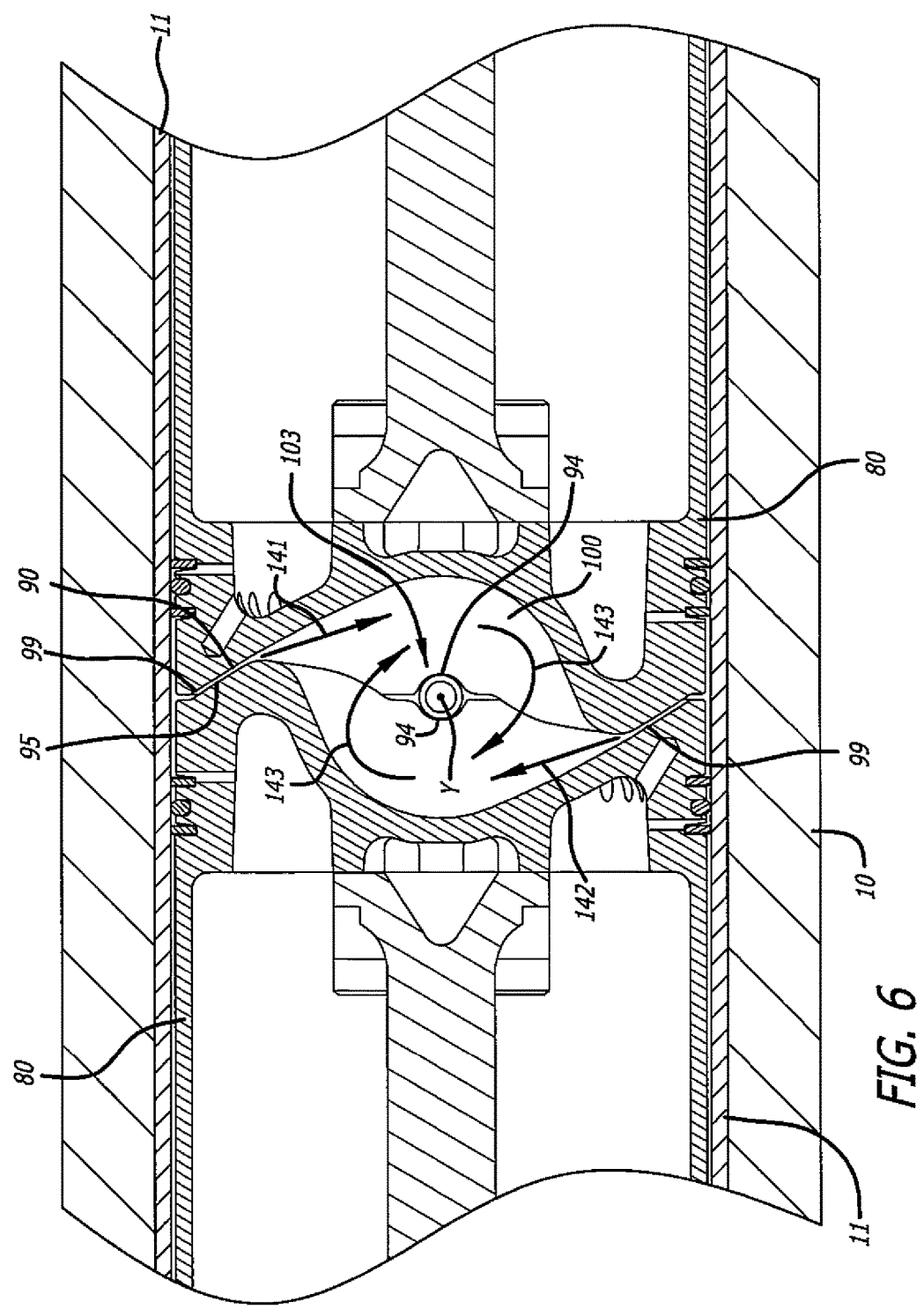
FIG. 6 is a side sectional drawing of a cylinder liner in which a pair of opposed pistons having the construction illustrated in FIGS. 4A and 4B are disposed.
Figure 7:
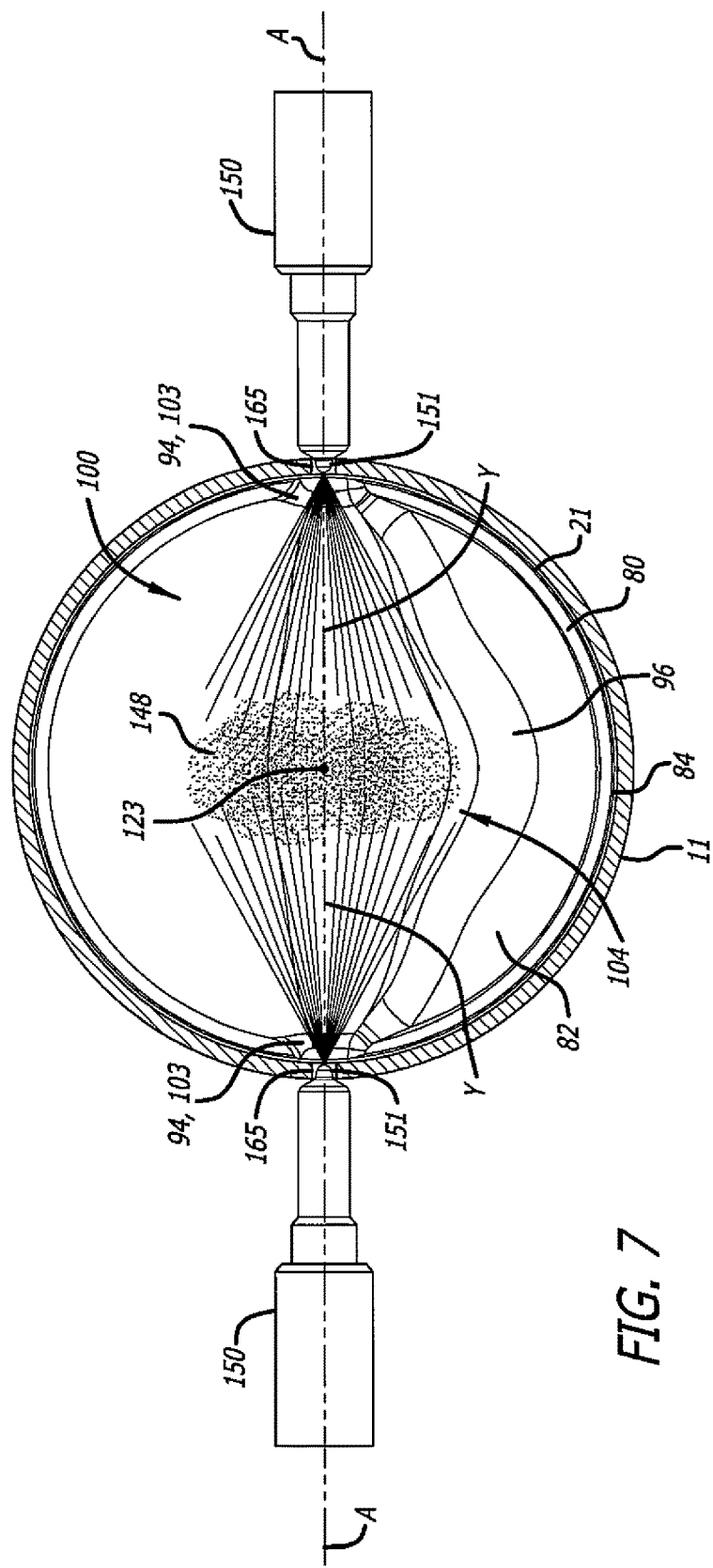
FIG. 7 is a diametrical cross-section of the cylinder liner of FIG. 6 showing an end view of one of the opposed pistons of FIG. 6 near a top dead center position.

Referring now to FIGS. 6 and 7, a cylinder 10 includes a liner (or sleeve) 11. Two opposed pistons 80 having end surfaces shaped as per FIGS. 4A, 4B and 5 are disposed in a cylinder bore defined by the liner 11. The pistons 80 are rotationally oriented in the bore so as to align the end surfaces in complement; that is to say, the concave surface portion 90 of one piston 80 faces the convex surface 95 of the other piston. When the pistons 80 are near BDC, charge air is forced through an intake port into the cylinder, as exhaust products flow out of the cylinder through the exhaust port. For purposes of scavenging and air/fuel mixing, the charge air is caused to swirl as it enters the cylinder. As the pistons 80 move from BDC toward TDC, the intake and exhaust ports close and the swirling charge air is increasingly compressed between the end surfaces 82. As the pistons 80 approach TDC, compressed air flows from the peripheries of the end surfaces through squish channels 99. These squish airflows enter a combustion chamber 100 having a cavity defined between the end surface bowls. At the same time, compressed charge air continues to swirl. As the pistons 80 move through their respective TDC locations, the opposing concave-convex surfaces 90, 95 mesh with one another to give the combustion chamber cavity its elongated shape. Opposing pairs of notches 94 in the end surfaces 82 define injection ports 103 that open into the combustion chamber 100 at opposing pole positions of the combustion chamber. As per FIG. 7, the combustion chamber has an elongated shape with a major axis Y that extends between the opposing pole positions. In other words, the injection ports 103 are aligned along the major axis Y.

Interactions between the end surfaces 82 and charge air are illustrated and described in related US 2011/0271932. In this regard, squish flows into the combustion chamber affect and are affected by swirl. With regard to FIG. 6, as the pistons move toward TDC, squish regions (between opposing concave-convex surface pairs 90, 95 produce locally high pressure that directs squish flows of charge air into the combustion chamber 100. In this regard, at the start of injection, when the pistons are near their respective TDC locations, the concave-convex surface pairs 90, 95 generate squish flows 141, 142 into the combustion chamber 100. These squish flows are oppositely-directed, parallel, and skewed with respect to the major axis Y. This spatial relationship causes generation of a tumbling motion 143 when the squish flows encounter the outwardly-directed end surface portions 92. The tumbling motion is a circulating motion of charge air in the combustion chamber that is at least generally transverse to the longitudinal axis of the cylinder; in the case of the tumbling motion 143, the circulation is also generally around the major axis Y. When swirl is added to charge air motion, the swirling motion, depending on its intensity, interacts with the squish flows to generate a more intense tumbling motion around the major axis Y than do the squish flows alone. In addition, the swirl-plus-squish interactions with the end surfaces of the pistons in the combustion chamber 100 produce additional tumbling motion about an axis that is orthogonal to the major axis. Thus, at the start of injection, the turbulent motion of the charge air in the combustion chamber 100 includes a swirl component, incoming squish flows, and tumble components about orthogonal tumble axes.

With reference to FIG. 7, fuel 148 is injected into the tumbling air in the combustion chamber space 100 by opposed injectors 150. According to the illustrated construction, the combustion chamber is essentially centered with respect to the longitudinal axis 123 of the cylinder (which is collinear with the pistons' longitudinal axes). When the pistons are near TDC, pairs of aligned notches 94 define at least two injection ports, one at each end of the combustion chamber cavity 100, aligned with the major axis Y thereof, and fuel is injected from two opposing injectors 150 through the injection ports.

In some aspects, it is desirable to inject opposing spray patterns of fuel into the turbulent charge air motion generated in the combustion chamber 100, where the opposing sprays meet in a central region of the combustion chamber and form a cloud of fuel that is well mixed with the compressed charge air due to the turbulence. With reference to FIG. 7, the view is a sectional one at or near the longitudinal midpoint of the cylinder liner 11, looking directly into the cylinder bore 21 toward a crown end surface 82 disposed in the bore at a position where it and the unseen crown end surface define the combustion chamber 100. According to the illustrated construction, the combustion chamber 100 is essentially centered longitudinally with respect to the cylinder's longitudinal axis 123. Fuel injectors 150 are positioned with their nozzle tips 151 disposed at injector ports 165. Each injector nozzle tip has one or more holes through which fuel 148 is injected through a respective injector port, into the combustion chamber 100. Preferably, each injector tip 151 sprays fuel 148 in a diverging pattern that is aligned with and travels through an injection port 103 along the major axis Y of the combustion chamber, into the central region 104 of the combustion chamber. Preferably, opposing spray patterns of fuel are injected into the turbulent air motion in the combustion chamber 100. In some aspects, the opposing spray patterns meet in the central region 104 of the combustion chamber and form a cloud of fuel vapor that is mixed with charge air having a complex turbulent motion that includes swirl, squish, and tumble components. Preferably, but not necessarily, the fuel injectors 150 are disposed such that their axes A are in alignment with each other and a diametrical direction of the bore 21. This causes the injector tips 151 to be oriented in opposition along a diameter of the cylinder that is aligned with the major axis Y.

General Combustion Chamber Description: With reference to FIGS. 3, 4A, 4B, and 5, the combustion chamber formed between identical crown end surfaces is described volumetrically by assigning respective values to the parameters RB, RT, H, RL, and R as a function of distance along the combustion chamber's major axis Y. The set of parametric values directly describes the construction of a three-dimensional crown end surface with a periphery, a bowl, and a ridge as exemplified by the end surface 82 of the piston 80. Since a combustion chamber is defined between the end surfaces of opposed pistons described by the values of RB, RT, R, H, and RL, the same set of parametric values describes the combustion chamber.

The first parameter, RB, has a value corresponding to the distance from the major axis Y of the combustion chamber to the periphery 84, taken along a line segment of a chord of the cylinder bore in which the opposed pistons are disposed for movement. The RB line segment is orthogonal to the major axis Y. RB is a known function of Y since the overall piston must be circular to fit in the cylinder. In those aspects where the periphery 84 is bordered by a flat circumferential area, the second parameter, RT, is measured between the major axis Y and the inner edge 85e of the flat circumferential area. RT is also typically a known function of Y since the flat circumferential area is typically an annular region (with the exception of the near-notch regions), although this is not required. The third parameter, R, is the radius of the main volume of a combustion chamber. A variation of R is typically specified as a function of distance along the major axis Y from the longitudinal center of the cylinder (where Y=0). In some aspects, R varies as a decreasing function of distance from the longitudinal center of the cylinder, which concentrates the combustion volume in the center of the cylinder, near its axis, and reduces heat transfer to the cylinder liner. An unrounded height, H, of the ridge 96 is specified as a function of distance along the major axis Y from the longitudinal center of the cylinder. In some aspects, H is specified as a decreasing function of distance from the longitudinal center of the cylinder. As the value of H decreases at a given cross-section, the lengths of the squish channels 99 decrease, and the cross-section of the combustion chamber becomes less-circular. As the value of H increases towards R, the cross-section of the combustion chamber becomes more circular, but this can create a piston ridge 96 that is difficult to manufacture and cool. These effects can be mitigated through specification of the ridge round radius, RL as a function of distance along the major axis Y from the longitudinal center of the cylinder. In some aspects, RL varies as a changing function of distance along the major axis Y. In this regard, larger RL values at a given cross-section reduce the circularity of the combustion chamber and decrease the length of the squish channels 99. In some crown constructions, RL is applied to a three-dimensional curve at the intersection of a pair of three-dimensional surfaces, resulting in an elliptical round in two-dimensional cross-sections of the crown. However, for simplicity circular rounds are used in the description of the crown shape represented by a sequence of two-dimensional cross-sections.

Figure 8A:
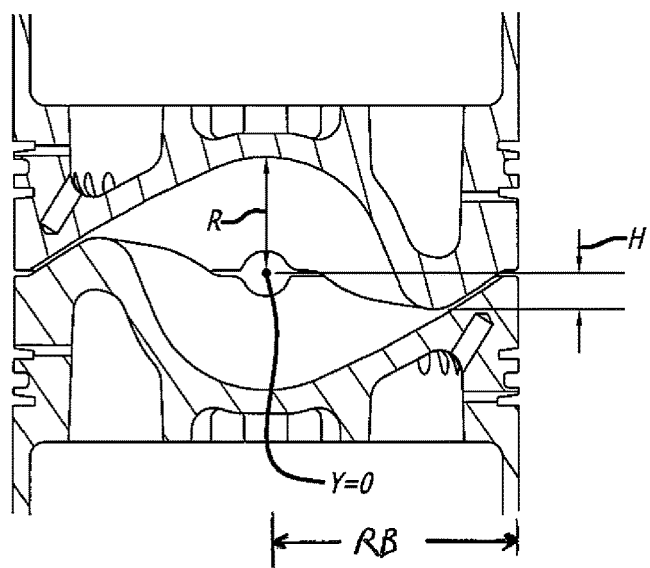
FIGS. 8A, 8B, and 8C are side sectional drawings corresponding to section lines 8A-8A, 8B-8B, and 8C-8C, of FIG. 5 and showing central, intermediate, and near-injector regions, respectively, of a combustion chamber formed between a pair of opposed pistons having the construction illustrated in FIGS. 4A and 4B.
Figure 8B:
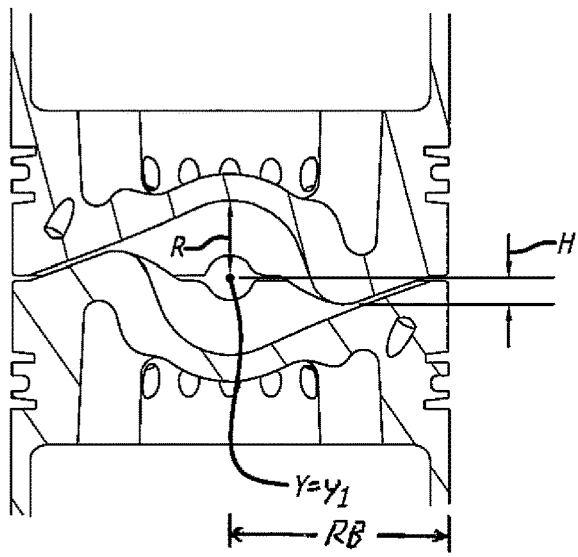
Figure 8C:
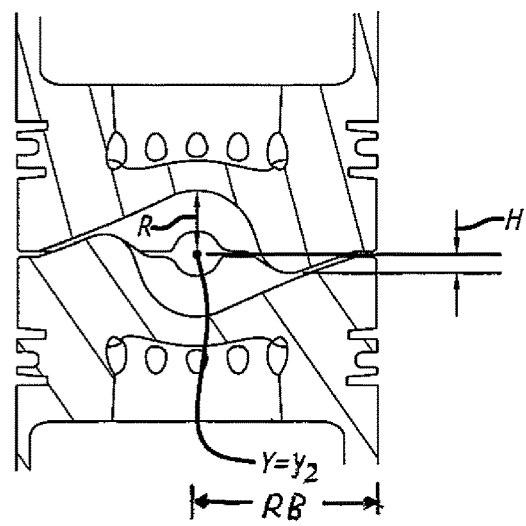

FIGS. 8A, 8B, and 8C are side sectional drawings corresponding to section lines 8A-8A, 8B-8B, and 8C-8C, of FIG. 5 and showing central, intermediate, and near-injector regions, respectively, of a combustion chamber according to FIG. 6 formed between the crowns of a pair of opposed pistons having the construction illustrated in FIGS. 4A and 4B. FIG. 8A corresponds to a plane that is orthogonal to the major axis Y of, and that bisects, the combustion chamber; in some aspects the plane contains the longitudinal axis of the cylinder. In this example, Y=0 and RB, RT, R, and H are at maximum values. FIG. 8B corresponds to a plane that is orthogonal to the major axis Y and intersects the combustion chamber at a value $Y=y_1$ that is greater than zero, but less than the radius of the cylinder bore. FIG. 8C corresponds to a plane that is orthogonal to the major axis Y and intersects the combustion chamber near an injection port 103, at a value $Y=y_2$ that approaches the radius of the cylinder bore. As per these figures, both R and H decrease in value from the longitudinal center of the cylinder in a direction along the major axis Y.

In the construction illustrated by FIGS. 8A-8C, representative values of the parameters depend entirely on the bore size. For example, presume a cylinder bore size of 98.425 mm for a representative opposed-piston engine. In this case, RB is (98.425 mm/2)*(cos($\pi$*Y/98.425 mm)) so that RB has a maximum value at Y=0 in FIG. 8A and consecutively smaller values at Y=y1 and Y=y2 in FIGS. 8B and 8C, respectively. Presuming that the annular border abutting the periphery 84 is 3 mm wide, then RT is (92.425 mm/2)*cos($\pi$*Y/92.425 mm). Representative values for the other parameters include, typically, a value of around 5 mm for RL near the position shown in FIG. 8A.

Figure 9:
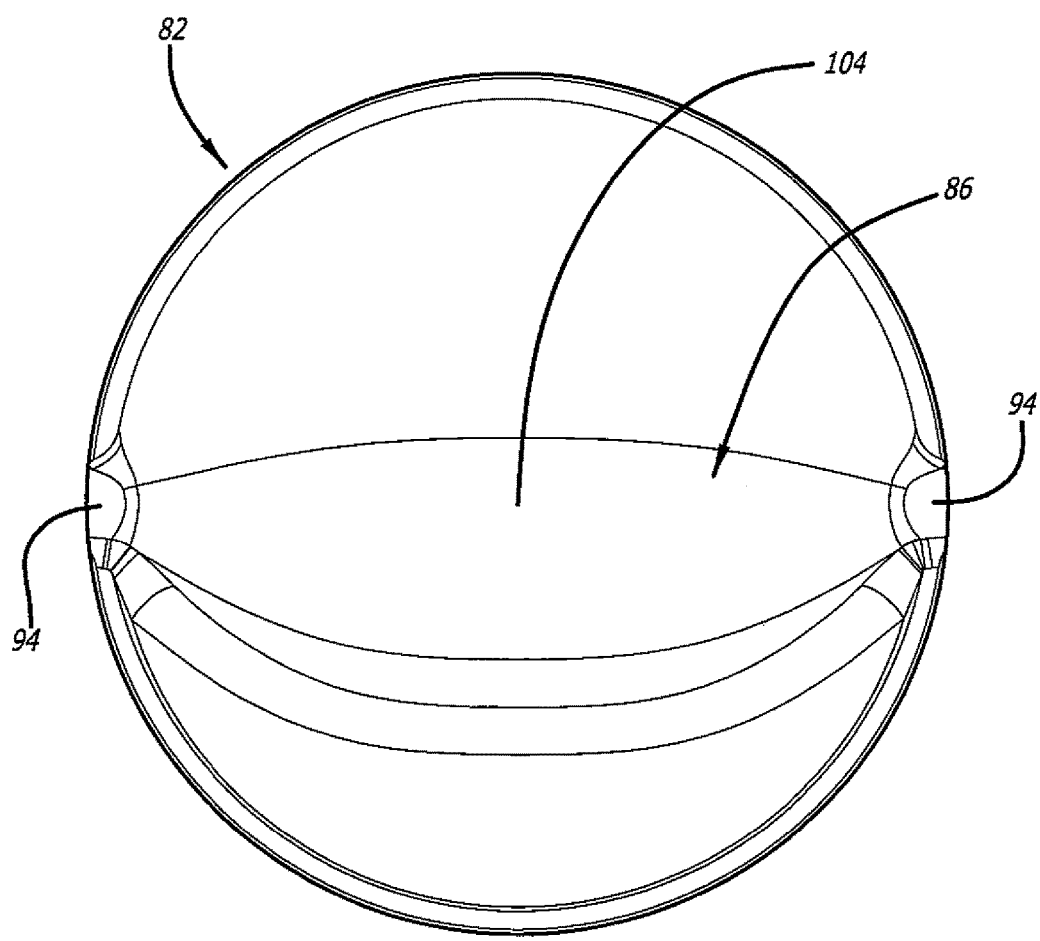
FIG. 9 is an end view of a piston crown with a bowl shape for forming an ellipsoidally-shaped combustion chamber of an opposed-piston engine.
Figure 10:
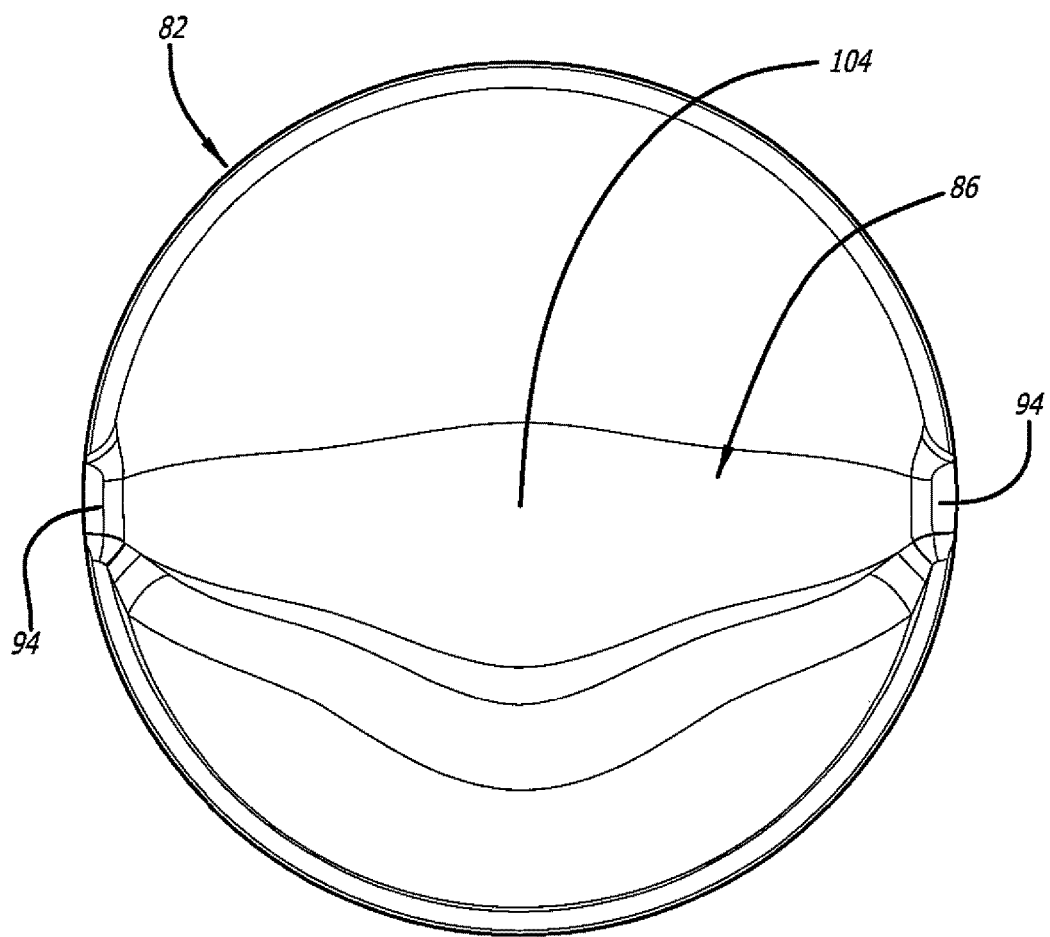
FIG. 10 is an end view of a piston crown with a bowl for forming a combustion chamber of an opposed-piston engine, in which the bowl shape has reduced volume near the injectors and reduced volume in the central region of the combustion chamber.

FIG. 9 illustrates a piston crown with a bowl 86 formed in the end surface 82 having a shape that forms an ellipsoidal combustion chamber. By adjusting the parameters described in the previous paragraph, volume is removed from the bowl shape of FIG. 9 near the injector notches 94, primarily by decreasing R but with modifications made to H and RL as well, and volume is added in the central region 104 of the combustion chamber, primarily by increasing R values in the region midway between the injector notches, with modifications made to H and RL. The resulting bowl shape is that shown in FIGS. 4A, 4B, and 5. The parameters can also be adjusted to produce a piston crown bowl 86 having a shape as seen in FIG. 10, which has a lower total clearance volume to increase the compression ratio while maintaining a similar geometrical shape. The bowl shape shown in FIG. 10 has reduced volume near the injector notches 94 and in the central region 104 of the combustion chamber.

Using the parameterized description disclosed and illustrated herein, modifications can be made to bowls formed in the crowns of opposed pistons for the purpose of controlling the distribution of volume within a combustion chamber in an opposed-piston engine. Refer to FIGS. 3 and 7 to understand an example of such distribution. Depending on the total clearance volume required to achieve a desired compression ratio and the local volume required for adequate air entrainment into the fuel sprays 148 from the injectors 150 at the periphery of the cylinder, the volume of the combustion chamber 100 can be concentrated in the central combustion chamber region 104 by decreasing R from a maximum value at Y=0 at a first rate that produces a generally spherical space centered midway between the injectors 150, and then reducing the rate of change of R to a second, lower rate that produces spaces on either side of the central region 104 that taper along the major axis Y toward the injectors 150. Positioning a larger portion of the volume of the combustion chamber in the middle of the cylinder in such a manner keeps the combusting mixture further away from the cylinder liner thereby reducing heat transfer losses.

Figure 11B:
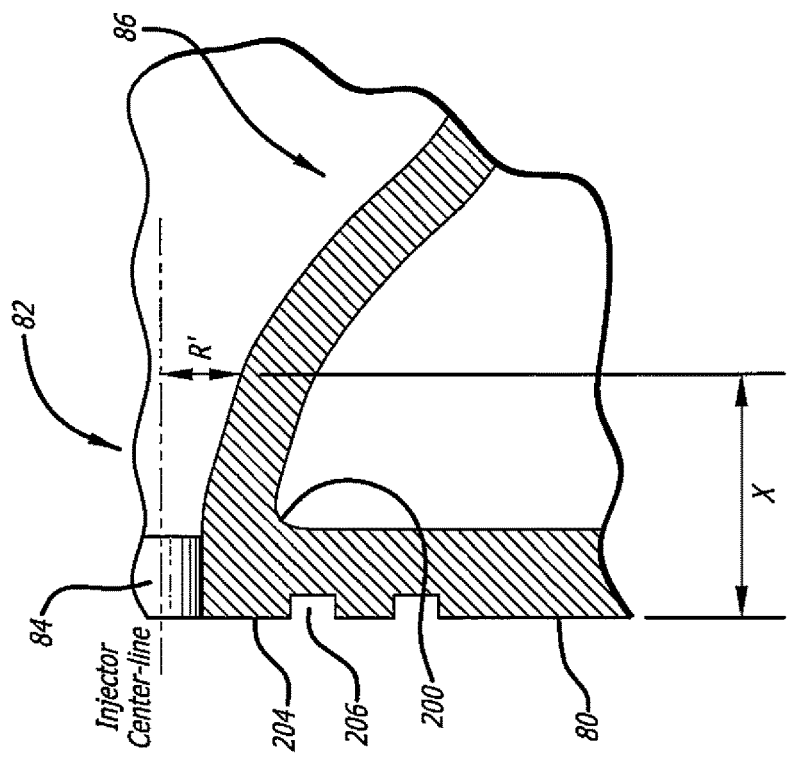
FIGS. 11A and 11B are enlarged, partial sectional views of a piston crown in an elevation view that is orthogonal to 4B-4B in FIG. 4A.
Figure 11A:
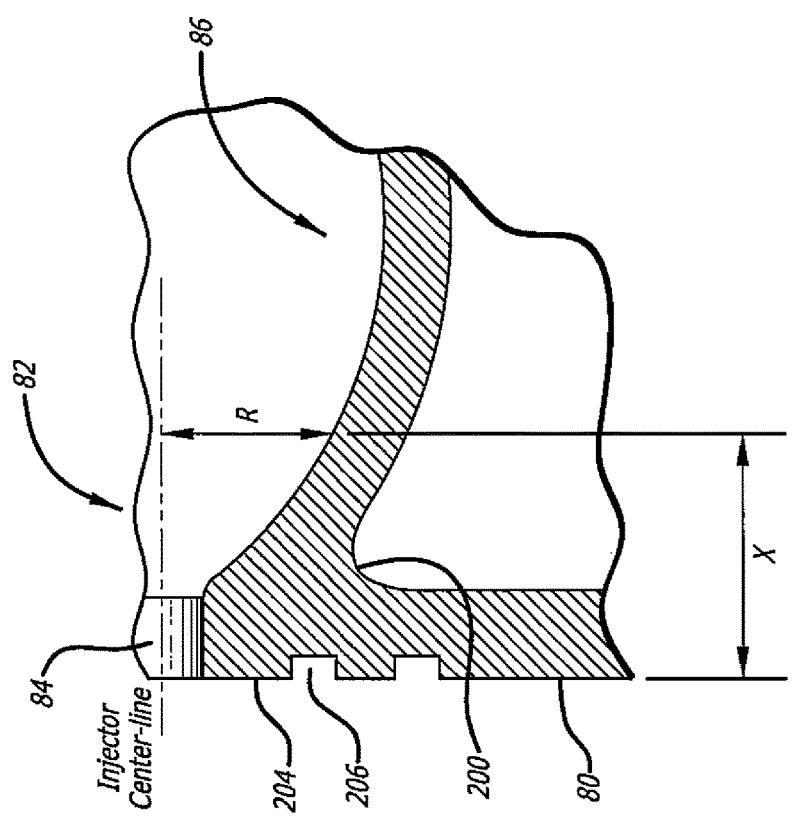

With reference to FIG. 4B, the piston 80 is constructed with an annular cooling gallery 200 inside the crown of the piston 80, a top land 204, and one or more circular ring-grooves under the land 204. It is desirable to limit the temperature of the ring grooves so as to reduce or eliminate coking of lubricating oil in the grooves, which can lead to ring jacking and subsequent ring and/or bore scuffing. One way to limit the ring groove temperature is to place as much of the cooling capacity of the gallery 200 as close to the top land 204 as possible. The construction of a highly contoured piston bowl such as is described and illustrated in this specification can be adapted to achieve this objective. In this regard, with reference to FIGS. 4B, 11A, and 11B, the combustion chamber radius R can be changed in value from a central combustion region of the bowl 86 along an axis or a diameter extending between the notches 94 in such a manner as to reduce volume of the bowl near the notches. For example, in the case of two diametrically-opposed fuel injectors, R changes value along an injector centerline 225 so as to enable the piston cooling gallery 200 to extend into an interior corner portion of the crown between the end surface 82 and the top land 204. For example, in FIG. 11A the value of R in bowl space near the periphery 84 of the end surface 82 transitions along the injector centerline in value toward a notch 94 at a first rate that provides more combustion chamber volume near the notch than the lower rate shown in FIG. 11B. In this regard, as per FIG. 11B the combustion chamber shape is modified so as to reduce the chamber volume near the injector notches 94, thereby enabling the cooling gallery 200 to extend further into the corner 202 between the end surface 82 and the top land 204 so as to insulate the top ring-groove 206 from the hot piston end surface 82. In some aspects, the reduction in combustion chamber volume near the notches 94 can be recovered by increasing the value of R in the central combustion region of the bowl 86.

The combustion chamber constructions described hereinabove are intended to be utilized in opposed-piston compression-ignition engines which impose swirl on the charge of air forced into the cylinder. Nevertheless, the combustion chamber construction can be utilized in those opposed-piston compression-ignition engines that do not swirl the charge air.

The pistons and associated cylinders described herein may be manufactured by casting and/or machining metal materials. For example, the pistons may be constituted of a skirt assembled to a crown on which an end surface with a shaped bowl is formed. As a further example, but without excluding other materials, the crown may comprise a high carbon steel such as 41-40 or 43-40, and the skirt may be formed using 4032-T651 aluminum. In such cases, the cylinder preferably comprises a cast iron composition.

Although an invention has been described with reference to preferred constructions, it should be understood that various modifications can be made without departing from the spirit of the invention. Accordingly, the invention is limited only by the following claims.

The invention claimed is:

1. A piston having a crown for defining a combustion chamber with the crown of an opposing piston, in which the crown has a periphery centered on the longitudinal axis of the piston, the piston comprising:
    a flat circumferential area extending from the periphery toward the longitudinal axis;
    a bowl within the periphery, the bowl defining a concave surface with a first portion curving inwardly toward the interior of the piston from a first plane that is orthogonal to the longitudinal axis of the piston and that contacts the periphery, and a second portion curving outwardly from the interior of the piston through the first plane; and,
    a convex surface within the periphery curving outwardly from the first plane and meeting the second portion of the concave surface to form a ridge; wherein,
    the flat circumferential area lies in the first plane; and
    the ridge has a height H that decreases from a maximum at a midpoint of a major axis of the combustion chamber in a direction along the major axis toward the periphery.

2. The piston of claim 1, in which opposing notches are provided in the periphery at respective positions on the major axis of the combustion chamber.

3. The piston of claim 2, in which the ridge has a rounded configuration having a radius RL in a second plane that orthogonally intersects the major axis of the combustion chamber.

4. The piston of claim 2, wherein the flat circumferential area has a generally annular shape except where the notches are positioned.

5. The piston of claim 4, in which a radius R changes in value from a central combustion region of the bowl along an axis extending between the notches to reduce volume of the bowl near the notches and a piston cooling gallery extends into an interior portion of the crown between an end surface of the crown and a top land on the crown.

6. The piston of claim 1, in which the ridge has a rounded configuration having a radius RL in a second plane that orthogonally intersects the major axis of the combustion chamber.

* * * * *